US006987766B2

(12) United States Patent
Mesh et al.

(10) Patent No.: US 6,987,766 B2
(45) Date of Patent: Jan. 17, 2006

(54) TRANSPORT OF SONET SIGNALS OVER AN OPTICAL COMMUNICATIONS NETWORK

(75) Inventors: Michael Mesh, Kfar Saba (IL); Yuval Porat, Ramat Aviv (IL); Irit Shahar, Ra'anana (IL)

(73) Assignee: Packetlight Networks Ltd., Kfar Saba (IL)

( * ) Notice: Subject to any disclaimer, the term of this patent is extended or adjusted under 35 U.S.C. 154(b) by 983 days.

(21) Appl. No.: 09/947,664

(22) Filed: Sep. 6, 2001

(65) Prior Publication Data

US 2003/0058865 A1 Mar. 27, 2003

(51) Int. Cl.
*H04L 12/28* (2006.01)

(52) U.S. Cl. ....................... 370/393; 370/410; 370/539; 370/466; 370/392; 370/395.51; 370/474

(58) Field of Classification Search ................. 370/466, 370/392, 395.51, 474, 539, 410, 393
See application file for complete search history.

(56) References Cited

U.S. PATENT DOCUMENTS

| | | | | | |
|---|---|---|---|---|---|
| 6,333,940 | B1 * | 12/2001 | Baydar et al. | .............. | 370/506 |
| 6,820,159 | B2 * | 11/2004 | Mok et al. | .................. | 710/305 |
| 6,831,932 | B1 * | 12/2004 | Boyle et al. | ................ | 370/539 |
| 6,839,871 | B2 * | 1/2005 | Patel et al. | ................. | 714/707 |
| 6,847,644 | B1 * | 1/2005 | Jha | ........................... | 370/392 |
| 2002/0093949 | A1 * | 7/2002 | Yasue et al. | ................ | 370/356 |
| 2002/0131408 | A1 * | 9/2002 | Hsu et al. | ................... | 370/355 |
| 2004/0190548 | A1 * | 9/2004 | Harel et al. | ................. | 370/466 |

FOREIGN PATENT DOCUMENTS

EP 1 245 388 A1 * 10/2002

OTHER PUBLICATIONS

Cisco Systems, Packet–over–SONET/SDH, 1999.*

ITU–T, G.707 (Mar. 1996) Network node interface for the synchrous digital hierarchy (SDH).*

* cited by examiner

*Primary Examiner*—Wellington Chin
*Assistant Examiner*—Binh Q Nguyen
(74) *Attorney, Agent, or Firm*—Dennison, Schultz, Dougherty & MacDonald

(57) ABSTRACT

A method and system for transporting SONET signals over an optical telecommunications network, the method including generating a ComBus signal, including payload data, J1/C1 and synchronous payload envelope (SPE), per SONET path, Smart extracting of data from the ComBus signal (J1 detection and N/P detection), gathering the payload data and J1 into short packets, adding a packet header to each short packet, transporting the short packets to a destination, and generating C1 and SPE at the destination so as to reconstruct the SONET signals out of the ComBus signal.

9 Claims, 8 Drawing Sheets

TRANSPORT OF SONET SIGNALS OVER AN OPTICAL COMMUNICATIONS NETWORK

FIELD OF THE INVENTION

The present invention relates to optical communications in general and, in particular, to transport of SONET signals over an optical communications network.

BACKGROUND OF THE INVENTION

Synchronous optical network (SONET) is a standard for optical telecommunications transport. It was formulated by the ECSA (European Speech Communication Association) for ANSI (the American National Standards Institute). The SONET standard is expected to provide the transport infrastructure for worldwide telecommunications for at least the next two or three decades.

The increased configuration flexibility and bandwidth availability of SONET provides significant advantages over the older telecommunications system. These advantages include the following:

- Reduction in equipment requirements and an increase in network reliability.
- Provision of overhead and payload bytes—the overhead bytes permit management of the payload bytes on an individual basis and facilitate centralized fault sectionalization.
- Definition of a synchronous multiplexing format for carrying lower level digital signals and a synchronous structure that greatly simplifies the interface to digital switches, digital cross-connect switches, and add-drop multiplexers.
- Availability of a set of generic standards that enable products from different vendors to be connected.
- Definition of a flexible architecture capable of accommodating future applications, with a variety of transmission rates.

In brief, SONET defines optical carrier (OC) levels and electrically equivalent synchronous transport signals (STSs) for the fiber-optic-based transmission hierarchy.

As stated above, SONET is a technology for carrying many signals of different capacities through a synchronous, flexible, optical hierarchy. This is accomplished by means of a byte-interleaved multiplexing scheme. Byte-interleaving simplifies multiplexing and offers end-to-end network management.

The first step in the SONET multiplexing process involves the generation of the lowest level or base signal. In SONET, this base signal is referred to as STS-1, which operates at 51.84 Mbps. Higher-level signals are integer multiples of STS-1, creating the family of STS-N signals. An STS-N signal is composed of N byte-interleaved STS-1 signals. For example, STS-3 is three times the rate of STS-1 ($3\times51.84=155.52$ Mbps). An STS-12 rate would be $12\times51.84=622.08$ Mbps.

The frame 10 structure or format of the conventional STS-1 signal is shown schematically in FIG. 1. In general, the frame 10 can be divided into two main areas: transport overhead 12 and the synchronous payload envelope (SPE) 14.

The synchronous payload envelope 14 can also be divided into two parts: the STS path overhead (POH) 16 and the payload 18, as seen in FIG. 2. The payload 18 is the revenue-producing traffic being transported and routed over the SONET network. Once the payload is multiplexed into the synchronous payload envelope, it can be transported and switched through SONET without having to be examined, and possibly demultiplexed, at intermediate nodes. Thus, SONET is said to be service-independent or transparent.

The STS-1 SPE may begin anywhere in the STS-1 envelope capacity, as illustrated schematically in FIG. 2. Typically, it begins in one STS-1 frame and ends in the next. The STS payload pointer (which points to J1), contained in the transport overhead, designates the location of the byte where the STS-1 SPE begins.

STS POH is associated with each payload, and is used to communicate various information from the point where a payload is mapped into the STS-1 SPE to where it is delivered.

When the frame rate of the SPE is too slow in relation to the rate of the STS-1, certain bits of the pointer word (I-bits) are inverted in one frame, thus allowing 5-bit majority voting at the receiver. Periodically, when the SPE is about one byte off, these bits are inverted, indicating that positive stuffing must occur. This is illustrated schematically in FIG. 3. An additional byte is stuffed in, allowing the alignment of the container to slip back in time. This is known as positive justification or stuffing, and the stuff byte is made up of non-information bits. This is important due to the synchronous nature of SONET. The actual positive stuff byte immediately follows the H3 byte (that is, the stuff byte is within the SPE portion). The pointer is incremented by one in the next frame, and the subsequent pointers contain the new value. Simply put, if the SPE frame is traveling more slowly than the STS-1 frame, every now and then stuffing an extra byte in the flow gives the SPE a one-byte delay.

Conversely, when the frame rate of the SPE frame is too fast in relation to the rate of the STS-1 frame, bits 8, 10, 12, 14, and 16 of the pointer word are inverted, thus allowing 5-bit majority voting at the receiver. These bits are known as the D-bits or decrement bits. Periodically, when the SPE frame is about one byte off, these bits are inverted, indicating that negative stuffing must occur, as shown schematically in FIG. 4. Because the alignment of the container advances in time, the envelope capacity must be moved forward. Thus, actual data is written in the H3 byte, the negative stuff opportunity (within the overhead); this is known as negative justification or stuffing.

The pointer is decremented by one in the next frame, and the subsequent pointers contain the new value. Simply put, if the SPE frame is traveling more quickly than the STS-1 frame, every now and then pulling an extra byte from the flow and stuffing it into the overhead capacity (the H3 byte) gives the SPE a one-byte advance. In either case, there must be at least three frames in which the pointer remains constant before another stuffing operation (and therefore a pointer value change) can occur.

A SONET frame (STS-N or Vc (virtual concatenation)) can be specified using a so-called TelecomBus Interface. A conventional TelecomBus is standard in local TDM processing (within a single ADM) but cannot be transmitted over large distances. Thus, it is used at present to send TDM SONET signals a short distance between SONET cards in telecommunications equipment. One example of a conventional TelecomBus Interface is shown schematically in FIG. 5.

The TelecomBus consists of the following signals:

SPE-1 of data=payload, 0-otherwise

C1/J1-1 if data=c1 byte in section overhead or j1 byte in path overhead

Data—The corresponding data byte

A SONET framer, which receives a SONET signal to be transported, is capable of producing the Telecombus from the SONET signal.

However, providing SONET services in current networks can be done only over dedicated SONET channels. This causes a great waste of bandwidth resources, which could have been shared between both SONET services and packet services. Another problem is difficult management of the SONET service trail. Each path has to be manually configured in any node it passes. Yet another difficulty is the synchronous nature of SONET—it is crucial to maintain synchronization, so as to be able to accurately reconstruct the data at the destination. This requires transportation of idle frames so as not to lose synchronization.

Accordingly, there is a long felt need for a method and system for providing both SONET services and packet services, and it would be desirable to have such a method which improves utilization of bandwidth resources.

SUMMARY OF THE INVENTION

The present invention provides a method for transporting SONET signals over an optical telecommunications network, the method including generating a ComBus signal, including payload data, J1/C1 and synchronous payload envelope (SPE), per SONET path, Smart extracting of data from the ComBus signal (J1 detection and N/P detection), gathering the payload data and J1 into short packets, adding a packet header to each short packet, transporting the short packets to a destination, and generating Cl and SPE at the destination so as to reconstruct the SONET signals out of the ComBus signal.

There is also provided in accordance with the present invention a system for transporting SONET signals over an optical telecommunications network, the system including a framer for generating a ComBus signal, including payload data, J1/C1 and synchronous payload envelope (SPE), per SONET path, a packetization module for smart extracting of data from the ComBus signal (J1 detection and N/P detection), gathering the payload data and J1 into short packets, and adding a packet header to each short packet, optical means for transporting the short packets to a destination, and a packetization module at the destination for generating C1 and SPE so as to reconstruct the SONET signals out of the ComBus signal.

BRIEF DESCRIPTION OF THE DRAWINGS

The present invention will be further understood and appreciated from the following detailed description taken in conjunction with the drawings in which.

DETAILED DESCRIPTION OF THE INVENTION

The present invention relates to a method and system for transporting SONET signals, together with packet services, over the same channels in an optical telecommunications network. This is accomplished by transmitting SONET signals (OC-N) over packets by combining the data and J1 signal from a plurality of SONET signals into a plurality of short packets. These SONET signals can be transmitted over a single network together with data from other packet services, or with other short packets, which can be synchronous or asynchronous. A packet header is added to each short SONET packet to instruct the destination node how to reconstruct the SONET data and synchronization after depacketization.

The method includes generating a ComBus signal from the SONET signal, which is similar to the conventional TelecomBus, but has a different structure and is capable of transporting data over long distances within the network, which is not possible with conventional TelecomBuses. The ComBus signal is generated out of the SONET signal. Then, data is enhanced, extracted, and gathered into short packets, which are transmitted in a high priority over a packet network, such as that described in full in co-pending U.S. patent application Ser. No. 09/753,400, to the same assignee.

The ComBus of the present application transmits parallel transmissions over short distances by a SERDES (serialization/deserialization) device, as known. This reduces RFI problems and eliminates problems of delay and loss, as all remain within the defined tolerance of SONET. It also permits the transmission of synchronous and asynchronous, packet and SONET services, over the same channels, so as to more completely utilize the available bandwidth.

Figure 1:
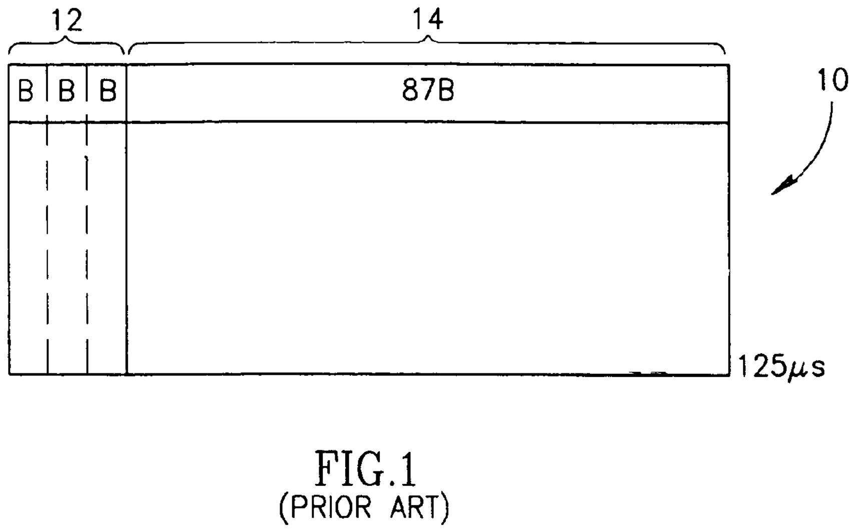
FIG. 1 is a schematic illustration of a prior art STS-1 Frame structure.
Figure 2:
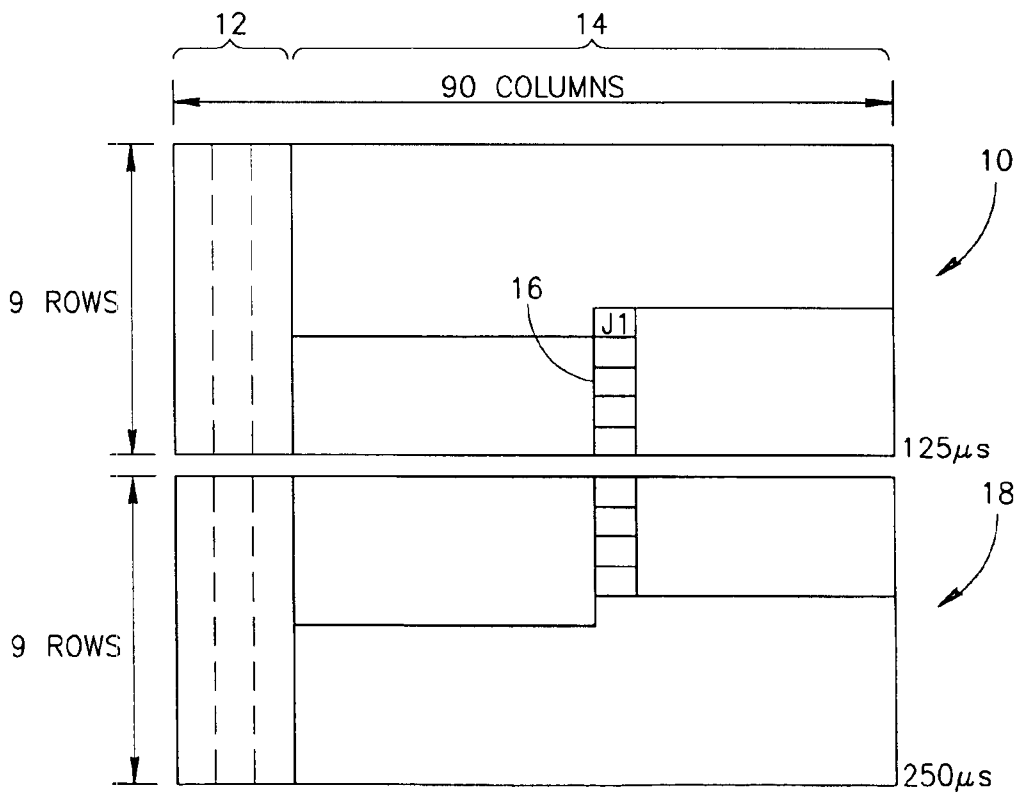
FIG. 2 is a schematic illustration of a prior art STS-1 Frame structure, indicating SPE position.
Figure 3:
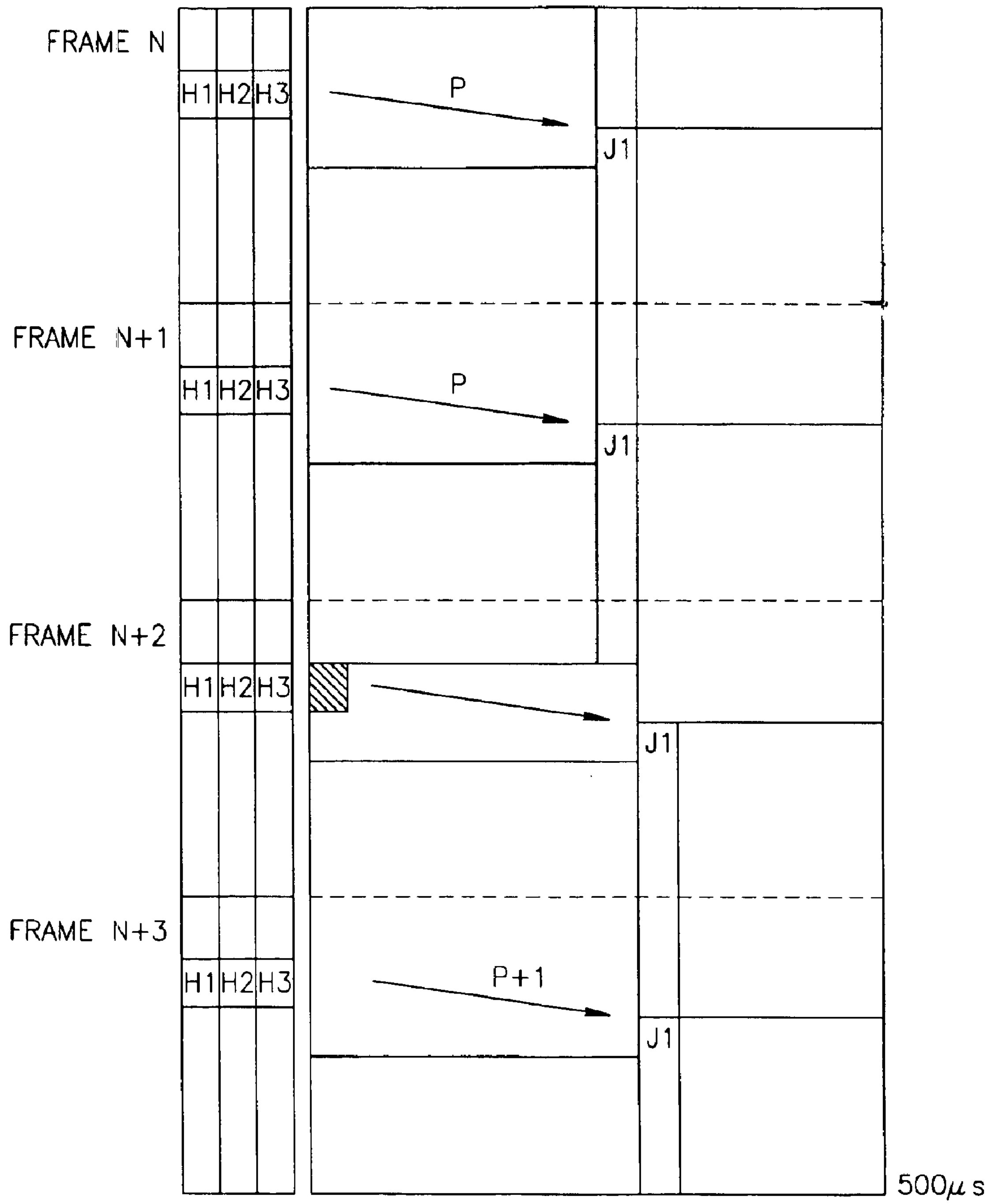
FIG. 3 is a schematic illustration of prior art positive justification.
Figure 4:
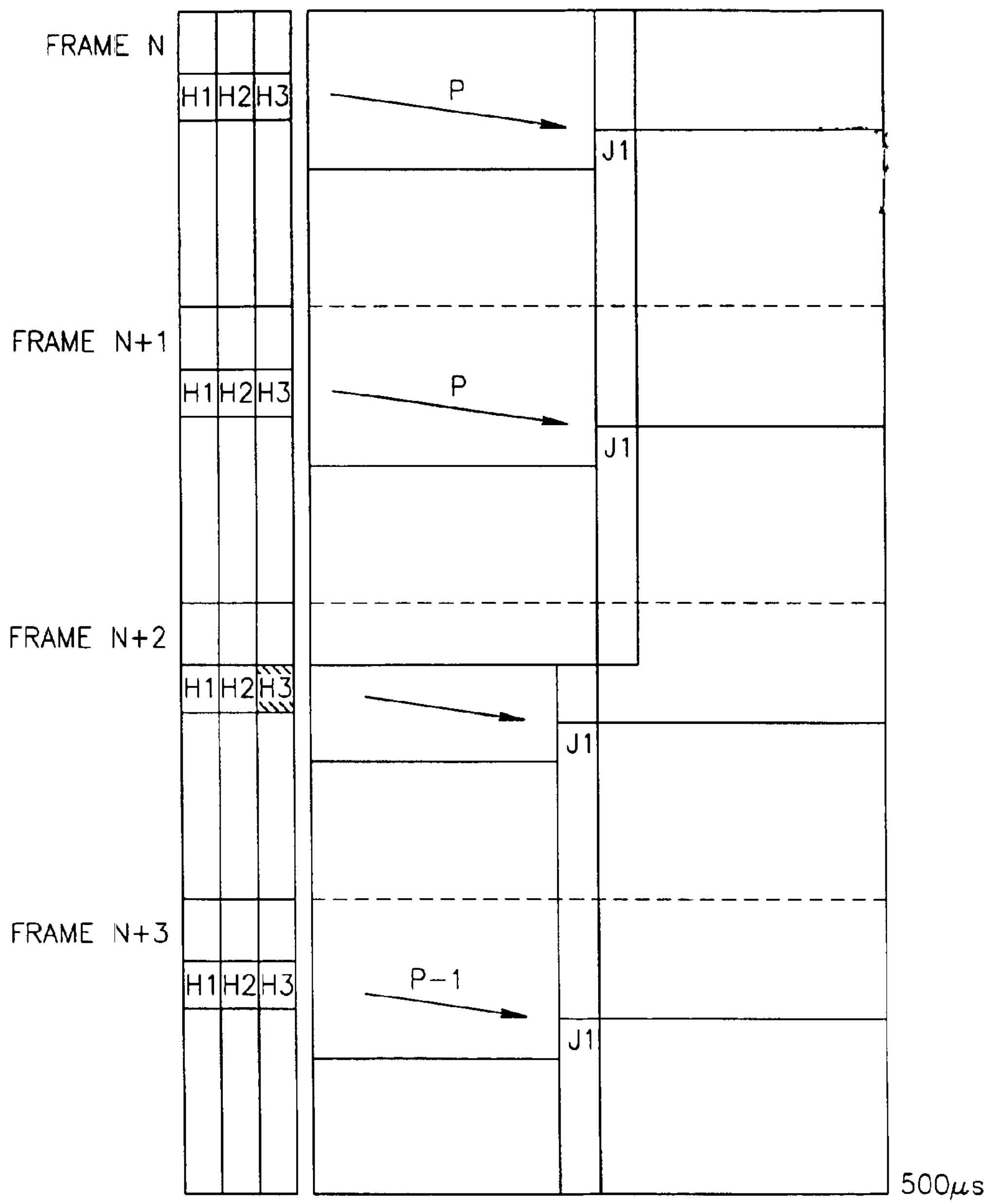
FIG. 4 is a schematic illustration of prior art negative justification.
Figure 5:
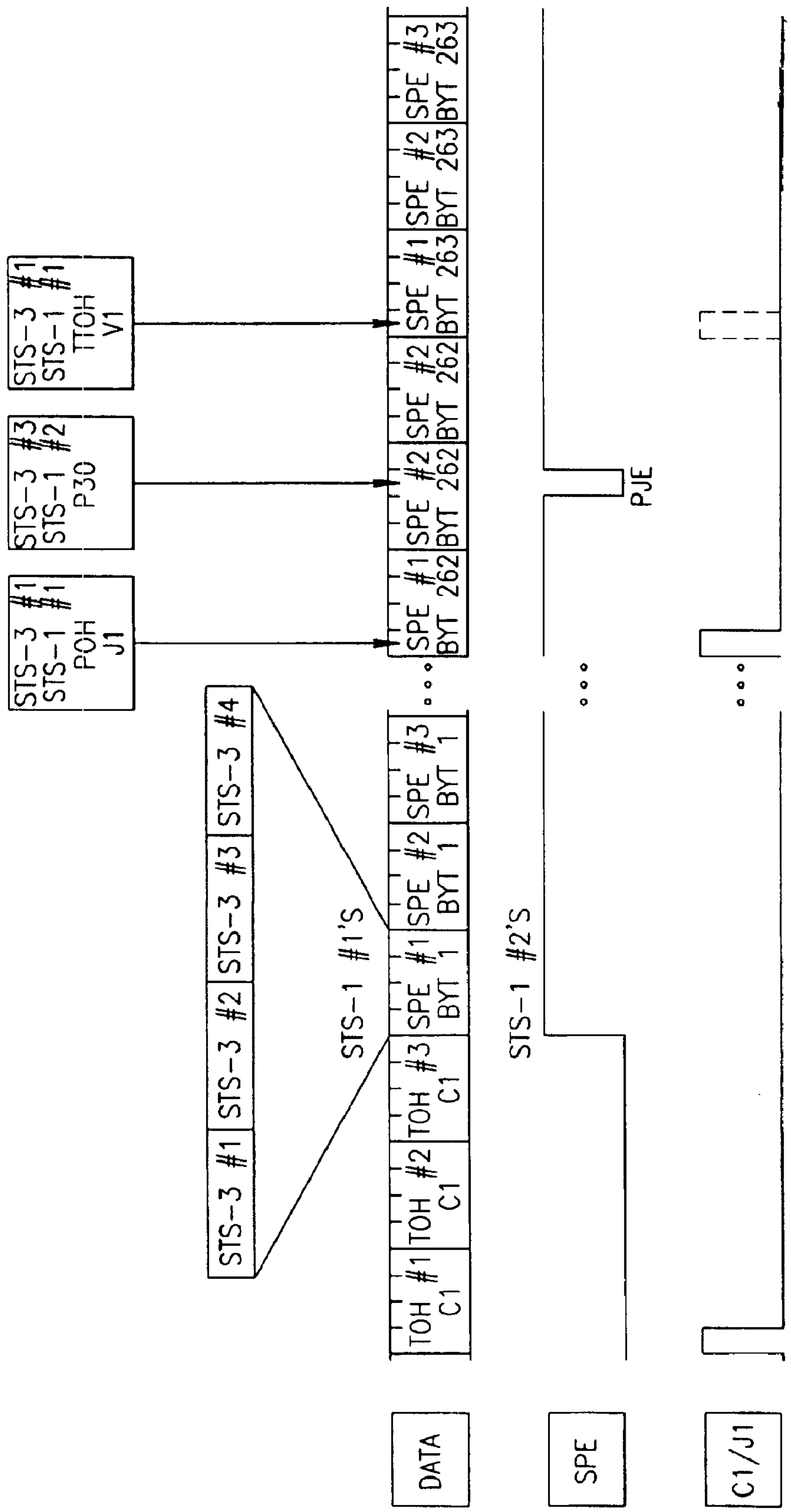
FIG. 5 is a schematic illustration of a prior art Telecom-Bus.
Figure 6:
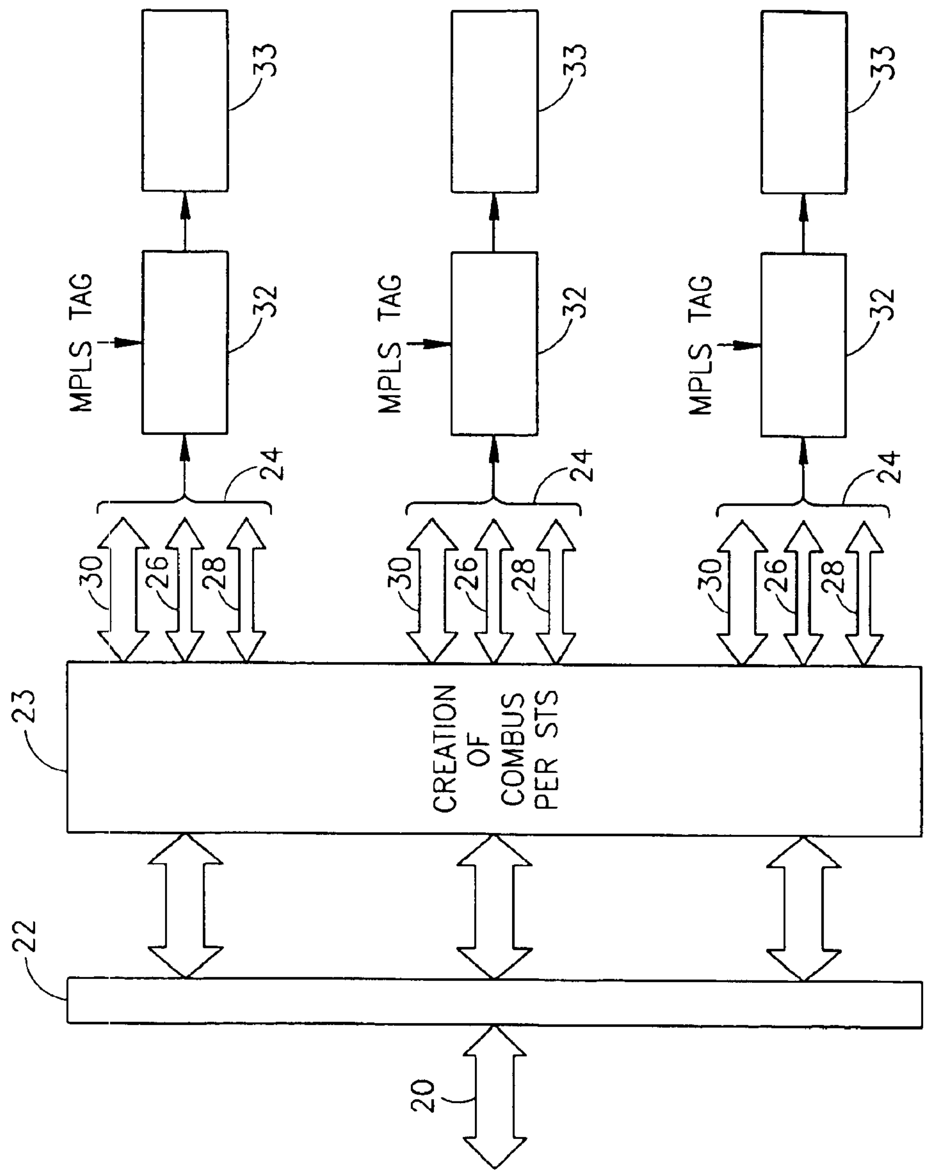
FIG. 6 is a schematic illustration of ComBus packetization according to one embodiment of the invention.

Referring now to FIG. 6, there is shown a schematic illustration of ComBus packetization according to one embodiment of the present invention. ComBus packetization, according to the present invention, includes the following processing operations:

- Generating a ComBus signal per SONET path;
- Smart extraction of enhanced data from ComBus (J1 detection, N/P detection);
- Gathering data into short packets.

Incoming SONET (OC-N) signals 20 for transport are received in a framer 22. Framer 22 can be a conventional framer, for example, the Specta-622-PM3513 (Oc-12 framer), manufactured and marketed by PMC-Siera Inc, Canada V5A4V7. Framer 22 generates a ComBus signal 24 from each SONET path. Each ComBus signal 24 consists of payload data 30, the SPE 26, which is on when a SONET payload is transmitted, and J1 C1 28, which is set if and when C1/J1 occurs.

The data 30 is collected in a packetization module 32, which also detects J1, P and N (location in SPE of the beginning of a SONET frame, Positive or Negative Justification). The packetization module 32 encapsulates the input data into MPLS (Multi-Protocol Label Switching protocol) over POS (Packet Over SONET/SDH) 33. The preferred method, described in detail in Assignee's co-pending U.S. patent application Ser. No. 09/753,400, includes the steps of segmenting an incoming bit stream, adding an MPLS tag to a header of each segment, each tag including data identifying the bit stream's route between source and destination end-points, and encapsulating the tagged segment into a Point-to-Point Protocol (PPP) packet in a frame. Thus, MPLS provides the switching layer. The standard used today and, therefore, the preferred frame at present, is a High bit rate Digital Link Control (HDLC)-like frame. Finally, the encapsulated PPP packet is mapped into a Packet over SONET (or Packet over SDH) (PoS) transmission packet frame for transmission. Thus PoS provides the physical layer for the data.

Figure 8:
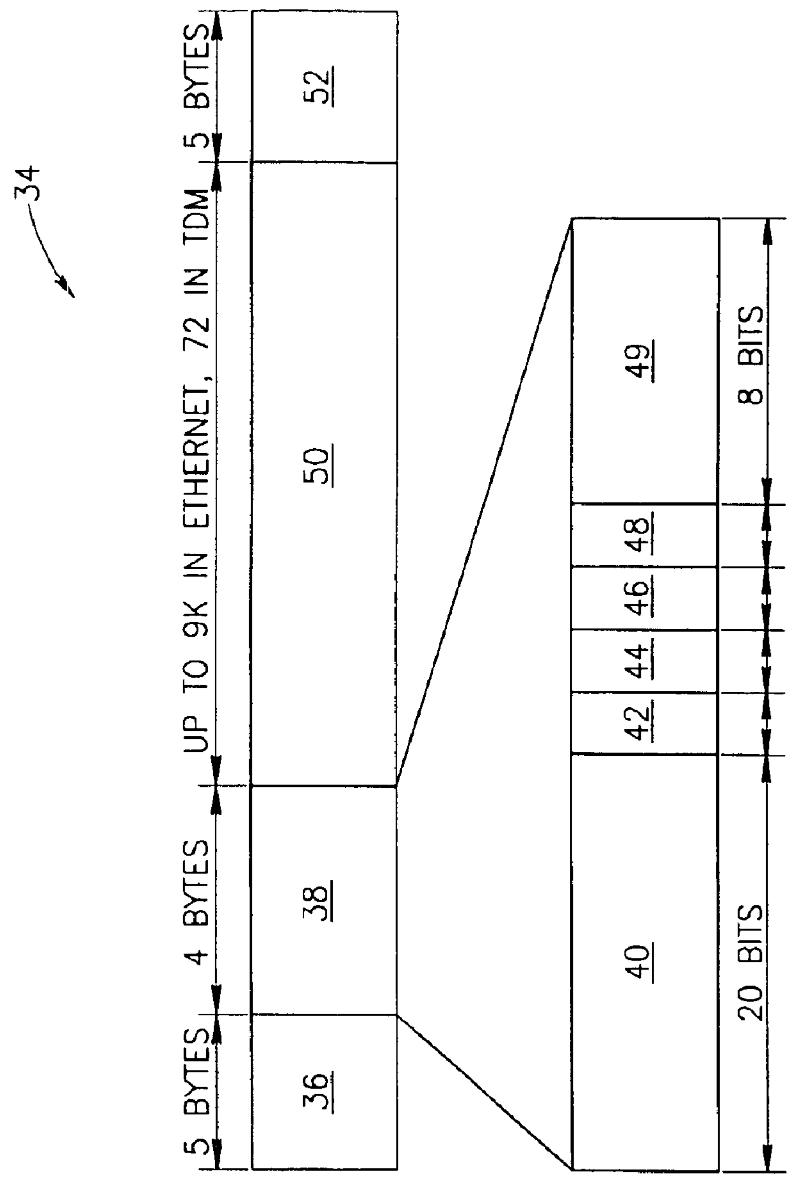
FIG. 8 is a schematic illustration of a generic packet header structure according to one embodiment of the invention.
Figure 9:
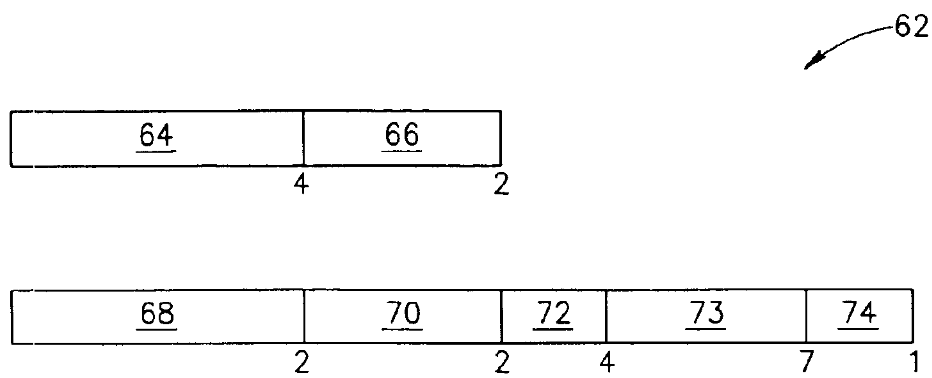
FIG. 9 is a schematic illustration of a SONET packet structure, according to one embodiment of the invention.

FIG. 8 is a schematic illustration of a generic packet format created by the preferred method of the invention. Packet 34 includes PPP protocol information 36, which is a standard component of any PPP packet. PPP protocol information 36 is followed by an MPLS tag 38. MPLS tag 38 is a 32 bits header that may be stacked on one another to enable nesting of MPLS clouds, and is composed of a label 40 indicating the route of the packet, and experimental (EXP) bits, including intra-network indications. In the illustrated embodiment, the EXP bits include a Protection bit 42, an Extra-traffic bit 44, and a priority indication 46, for the SONET over PoS of the present invention, indicated as High Priority Group. The tag 38 also includes a Stack bit 48, and a TTL byte 49, as known in conventional MPLS tags. It will be appreciated that this internal use of the EXP bits does not limit any external use of EXP bits, if it should be required in the future.

After the MPLS tag, comes the data packet 50. Data packet 50 is the data frame combining all data services to be sent over the fiber (Ethernet, Fibre Channel, etc.) with an arbitrary payload slice in TDM services (SONET packets as formed from the ComBus). The packet is closed with a PPP protocol closure 52, including FCS and a flag to indicate the end of the PPP packet, as known.

Thus, the packetization module creates a short packet of tagged data from incoming SONET signals, for transport over the network, including the destination address, and SPE information to permit reconstruction of the original SONET signal at the destination. Thus, the framer 22 generates all three signals: data, SPE and C1/J1, which are required in order to reconstruct the SONET signal out of the ComBus.

It is a particular feature of the invention that, instead of packetizing the whole ComBus signal (data, SPE, C1/J1), only J1 & data are packetized. This saves the Transport Overhead (TOH) transmission that is irrelevant, and permits much more efficient utilization of bandwidth resources.

Figure 7:
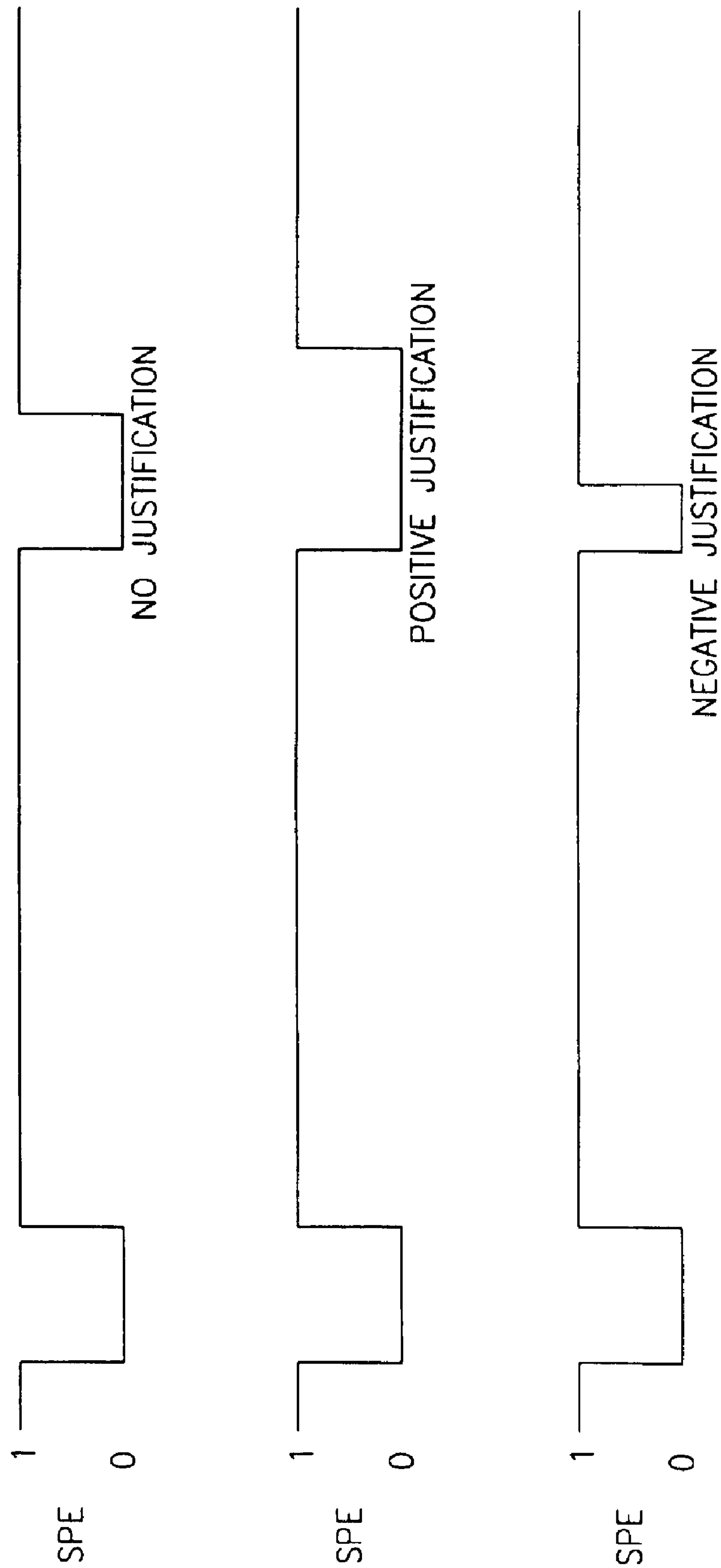
FIG. 7 is a schematic illustration of a method detecting N/P Justification, in accordance with one embodiment of the present invention.

The J1 indication is extracted from C1/J1 signal and packetized together with Negative /Positive (N/P) justification. It will be appreciated that J1 is simply C1/J1 signal when SPE=1.N/P justification can easily be determined since the time width in which the SPE=0 is constant, if there is no justification. It is shorter (in one byte time) in negative justification & larger in positive justification. Negative/ Positive justification is detected according to SPE width changes in the near end, as illustrated in FIG. 7, and reported to the far end via the packet header. C1 & SPE are generated at the far end.

Figure 10:
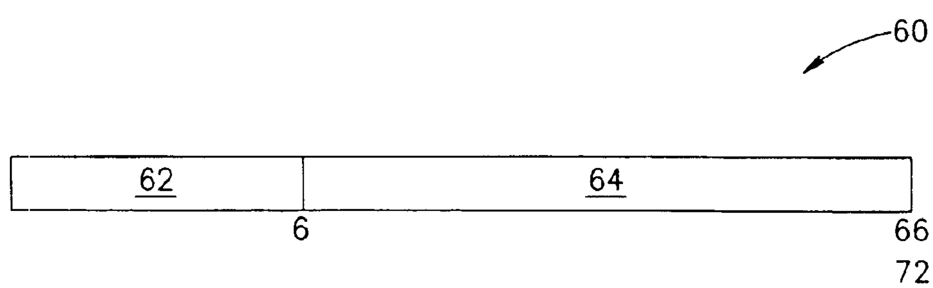
FIG. 10 is a schematic illustration of the structure of a SONET packet header according to one embodiment of the invention.

Referring now to FIG. 10, there is shown a schematic illustration of a SONET packet 60 as packetized by a preferred packetization method of the present invention for transportation over a packet network. SONET packet 60 includes a SONET packet header 62 and the data 64 to be transported, as described above. Preferably, the packet is short, having a fixed size of 72 bytes. The packet is assigned highest priority in the packet network.

FIG. 8 is a schematic illustration of the structure of a SONET packet header 62 according to one embodiment of the invention. The SONET packet header 62 includes an MPLS header 64, as described above in the generic packetization process, and a ComBus header 66.

ComBus header 66, in turn, includes an indication 68 of J1 and justification, as described above, as well as a packet Cyclic ID 70, to enable detection of packet loss. Error correcting CRC 72 is calculated on the header & inserted to packet header 62. If J1 is present, the value of J1 appears in the header at 73. Finally, a parity bit 74 completes the ComBus header.

At the far end, the data and packet header are received in a framer (see FIG. 6 in the receiving direction). In the framer, the MPLS tag is removed, leaving the data and J1. C1 & SPE signals are generated from the same clock at far end. (J1 is composed with C1 signal to create C1/J1.) Negative/Positive justification is inserted in the far end, according to instructions in the message header, by changing the SPE width. The packet Cyclic ID is examined to enable detection and recovery from packet loss.

A ComBus signal is generated for every SONET path (i.e STS-1, STS-3c, etc). Therefore, each SONET path resides in an MPLS flow. This provides the capabilities of designating different SONET paths to different destinations, or Fractional SONET Service (transmitting only partial paths).

Preferably, the SONET packets are short, fixed sized & and assigned the highest priority. This guarantees low delay, which is essential for TDM. In addition, to make the solution flexible, DCC (Data Communication Channel) transmission can be enabled by using another MPLS flow for merely DCC traffic.

It will be appreciated by those skilled in the art that providing SONET services (OC-N frames) over packets permits packet networks to provide both SONET & packet services over the same channels. This substantially increases efficiency of utilization of bandwidth resources, which can now be shared between both SONET services & packet services. In addition, as will be appreciated by those skilled in the art, this method obviates the need for a SONET ADM and a separate SONET interface in the network, by providing a single, generic interface which is capable of transmitting both SONET packets and packets including other types of services.

It will be appreciated that the invention is not limited to what has been described hereinabove merely by way of example. Rather, the invention is limited solely by the claims which follow.

What is claimed is:

1. A method for transporting SONET signals over an optical telecommunications network, the method comprising:

generating a ComBus signal, including payload data, J1/C1 and synchronous payload envelope (SPE), per SONET path;

Smart extracting of data from the combus signal (J1 detection and N/P detection);

gathering said payload data and J1 into short packets;

adding a packet header to each short packet;

transporting said short packets to a destination; and generating C1 and SPE at said destination so as to reconstruct said SONET signals out of said ComBus signal.

2. The method according to claim 1, wherein said step of extracting enhanced data includes J1 (STS payload pointer) detection and N/P (Negative/Positive justification) detection.

3. The method according to claim 1, wherein said step of adding a packet header includes adding a ComBus header including J1 and N/P justification, cyclic ID and CRC (error correction).

4. The method according to claim 3, further comprising adding an MPLS (Multi-Protocol Label Switching protocol) tag to said ComBus header, said MPLS tag including route of the packet, experimental (EXP) bits, a Stack bit, and a TTL byte.

5. The method according to claim 4, wherein said EXP bits include a Protection bit, an Extra-traffic bit, and a priority indication.

6. The method according to claim 1, wherein said step of gathering includes:

segmenting an incoming bit stream;

adding an MPLS (Multi-Protocol Label Switching protocol) tag to a header of each segment, each tag including data identifying the bit stream's route between source and destination end-points;

encapsulating the tagged segment into a Point-to-Point Protocol (PPP) packet in a frame; and mapping said encapsulated PPP packet into a Packet over SONET (or Packet over SDH) (PoS) transmission packet frame for transmission.

7. The method according to claim 6, wherein said step of encapsulating the tagged segment includes encapsulating the tagged segment into a Point-to-Point Protocol (PPP) packet in a High bit rate Digital Link Control (HDLC)-like frame.

8. A system for transporting SONET signals over an optical telecommunications network, the system comprising:

a framer for generating a ComBus signal, including payload data, J1/C1 and synchronous payload envelope (SPE), per SONET path;

a packetization module for smart extracting of data from said ComBus signal, for gathering said payload data and J1 into short packets, and adding a packet header to each short packet;

optical means for transporting said short packets to a destination; and a packetization module at said destination for generating C1 and SPE, so as to reconstruct said SONET signals out of said ComBus signal.

9. The system according to claim 8, wherein said enhanced data includes an STS payload pointer (J1) and an N/P (Negative/Positive justification) indicator.

* * * * *